United States Patent [19]

Larson

[11] Patent Number: 5,986,559
[45] Date of Patent: Nov. 16, 1999

[54] INFINITELY ADJUSTABLE POSITION SENSOR WITH VISUAL CONFIRMATION

[75] Inventor: Tad D. Larson, Anamosa, Iowa

[73] Assignee: Rockwell International Corporation, Milwaukee, Wis.

[21] Appl. No.: 08/928,986

[22] Filed: Sep. 12, 1997

[51] Int. Cl.⁶ ................................................. G08B 21/00
[52] U.S. Cl. ................... 340/672; 33/1 PT; 172/4.5; 340/684; 340/689
[58] Field of Search .................... 340/672, 673, 340/679, 684, 686.1, 687, 689; 180/282, 290, 900; 280/DIG. 1; 414/700; 200/61.52, 61.45 R, 52 A; 172/2, 4.5; 33/1 PT

[56] References Cited

U.S. PATENT DOCUMENTS

| | | | |
|---|---|---|---|
| 4,159,474 | 6/1979 | Wooldridge | 340/684 |
| 4,167,733 | 9/1979 | Krause et al. | 340/689 |
| 4,276,975 | 7/1981 | Jenkins | 340/689 |
| 4,703,315 | 10/1987 | Bein et al. | 340/689 |
| 5,263,258 | 11/1993 | Dobler et al. | 33/1 PT |
| 5,339,906 | 8/1994 | Fox et al. | 172/4.5 |
| 5,746,005 | 5/1998 | Stewberg | 33/1 PT |

*Primary Examiner*—Jeffery A. Hofsass
*Assistant Examiner*—John Tweel, Jr.
*Attorney, Agent, or Firm*—Kyle Eppele; James P. O'Shaughnessy

[57] ABSTRACT

An infinitely adjustable position sensor is provided. The position sensor can be used as a head position switch which generates an output indicative of a position of a harvesting head of a harvesting vehicle, or in similar applications with other types of equipment. The sensor includes a body attachment mechanism for coupling the sensor to the body of the vehicle or other equipment, and a head attachment mechanism for coupling the sensor to the feeder house which supports the harvesting head. For adjustment of the sensor, particularly prior to operation, visual feedback is provided by an LED ring in order to inform the operator of the state or position of the sensor.

16 Claims, 6 Drawing Sheets

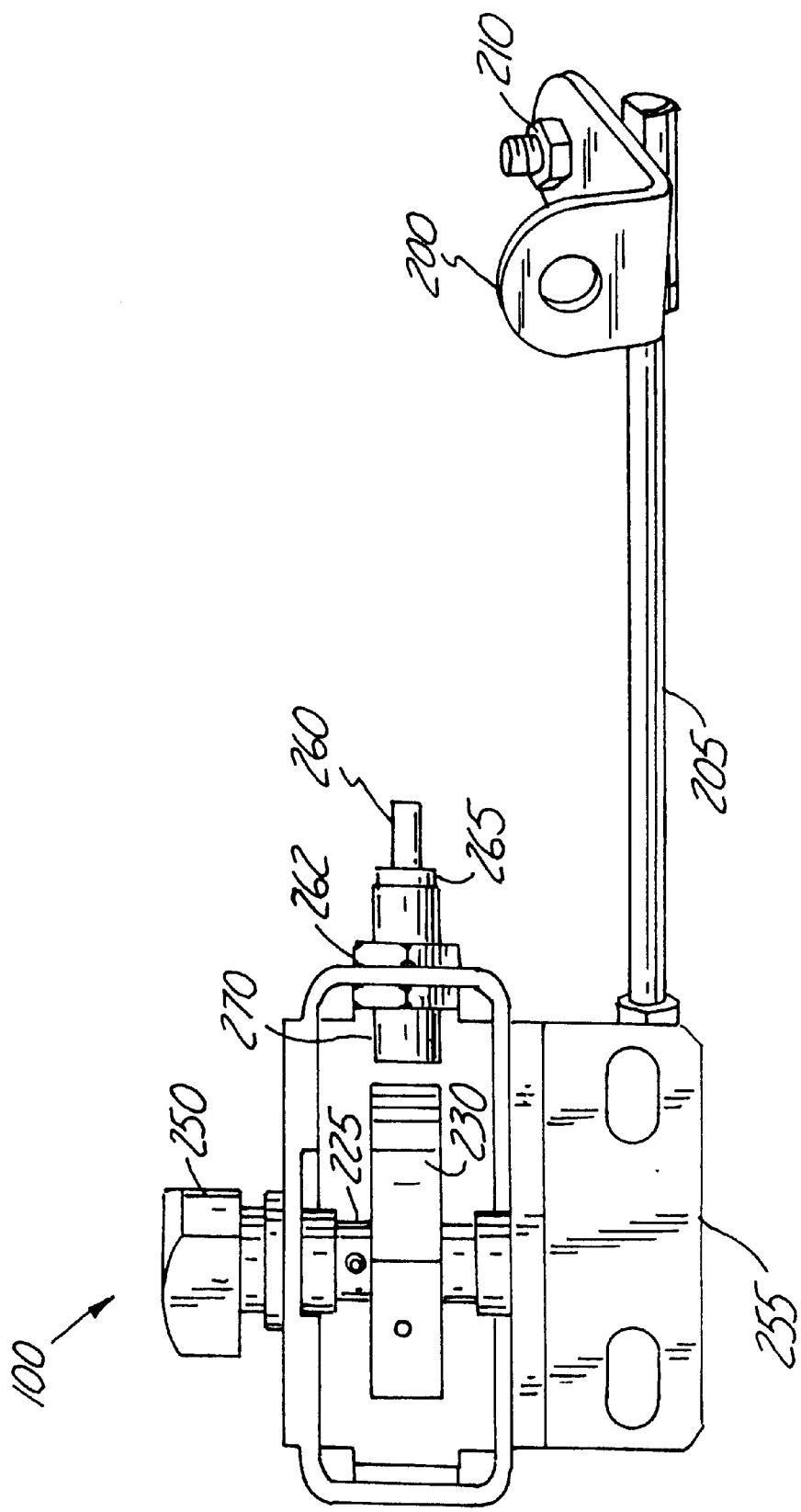

INFINITELY ADJUSTABLE POSITION SENSOR WITH VISUAL CONFIRMATION

FIELD OF THE INVENTION

The present invention relates generally to agricultural or other types of equipment, such as a combine for harvesting a crop. More particularly, the present invention relates to an infinitely adjustable position sensor for use on equipment to identify the position of one component of the equipment relative to another. The present invention has particular applicability for use in identifying the position of a harvesting head of a combine.

BACKGROUND OF THE INVENTION

When using equipment or vehicles such as farming equipment or construction equipment, it is frequently important to know when a particular piece of the equipment is in a desired position relative to some reference point, such as the body of the equipment or vehicle. Conventional position switches or sensors have had a number of disadvantages. For example, they frequently do not provide much flexibility in where the position sensor attaches to the equipment. Also, they do not typically provide any feedback to help the operator adjust the sensor at set-up or installation.

As a specific example, agricultural crop harvesting equipment, such as combines, have a harvesting head which must be lowered while in use, and raised while not in use. Head position sensors or head switches attached to the head provide electrical signals which indicate a position of the head. The head switch signals generated by the head switch on a combine provide an indication of the time and location at which the head is raised or lowered, which can be used as a starting or stopping point for creating a yield map for a field.

One type of conventional head switch utilizes a spring loaded hinge and magnet design to generate the position signal. The hinge with a magnet on it is mounted near a read switch. When the head of the combine is raised, the read switch comes into contact with the magnet. As a result, an electrical signal is generated which is indicative of the position of the head.

Conventional head switches of the type described above have a number of disadvantages. For example, this type of head switch is not particularly rugged and occasionally proves to be unreliable. With the head switch exposed to impact with rain, dust, crops and the like, this lack of ruggedness can be a significant disadvantage. Further, with conventional head switches, it is difficult for the operator of the combine to determine when the head switch is properly adjusted and/or when the head of the combine is in the desired position. Also, these prior art head switches can only be mounted in a limited number of positions between the combine body and the harvesting head.

Consequently, an improved position sensor for use with equipment such as combines which overcomes these and other problems would be highly beneficial.

SUMMARY OF THE INVENTION

An infinitely adjustable position sensor is provided. The position sensor can be used as a head position switch which generates an output indicative of a position of a harvesting head of a harvesting vehicle, or in similar applications with other types of equipment. The sensor includes a body attachment mechanism for coupling the sensor to the body of the vehicle or other equipment, and a head attachment mechanism for coupling the sensor to feeder house which supports the harvesting head. For adjustment of the sensor, particularly prior to operation, visual feedback is provided by an LED ring in order to inform the operator of the state or position of the sensor.

BRIEF DESCRIPTION OF THE DRAWINGS

FIG. 4 is a diagrammatic side view of the head switch of the present invention illustrated in FIGS. 2 and 3.

DETAILED DESCRIPTION OF THE PREFERRED EMBODIMENTS

Figure 1:
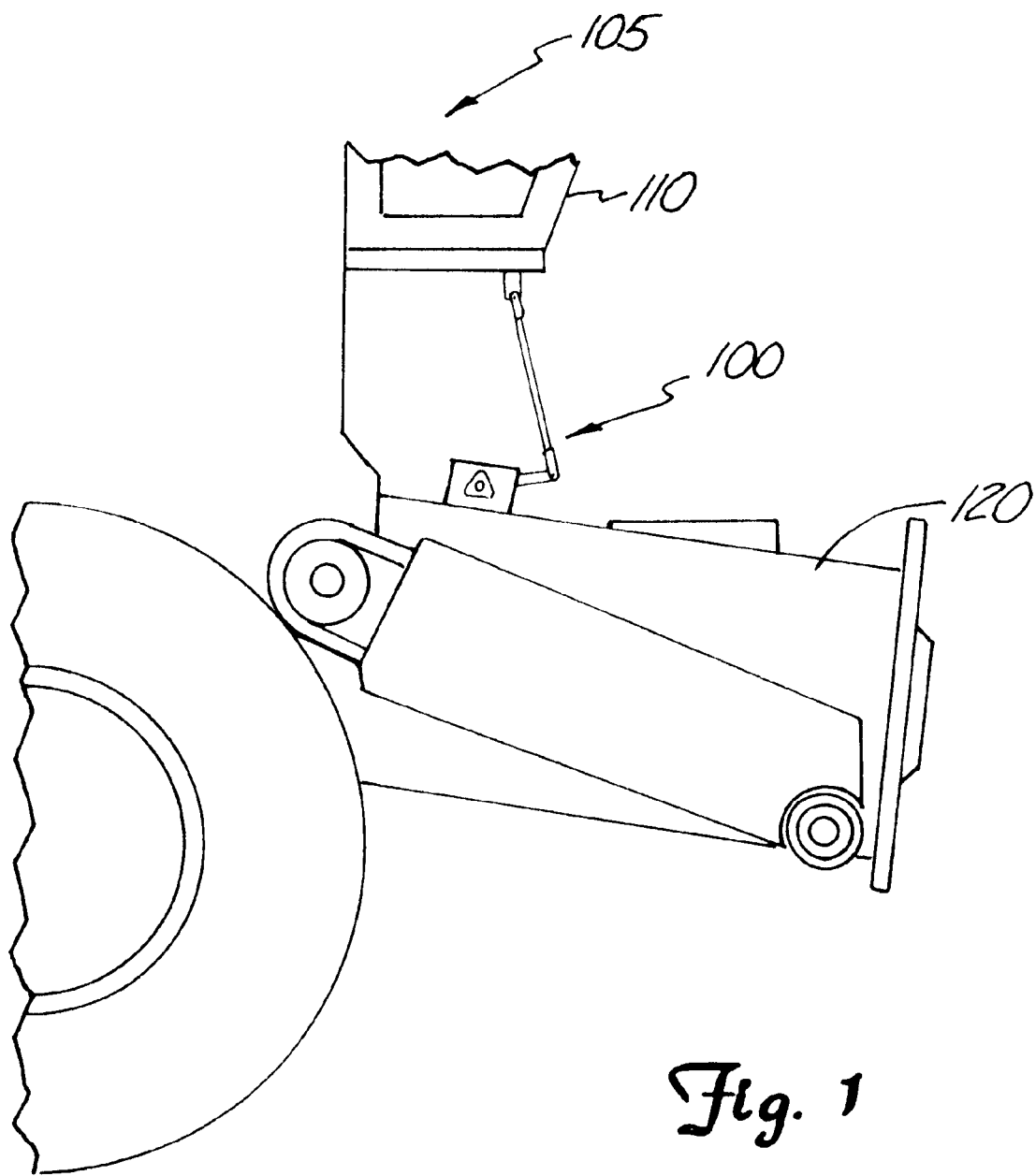
FIG. 1, is a diagrammatic side view illustrating the position sensor or head switch of the present invention installed on a combine.

FIG. 1 is a diagrammatic side view illustrating position sensor 100 of the present invention installed on a combine 105. While position sensor 100 is described with reference to its use on combine 105, it must be noted that sensor 100 can be used with a wide variety of equipment such as crop harvesting equipment or other vehicles. Further, while position sensor 100 is described as a head position switch in the following discussions in which sensor 100 is used to determine the position of a harvesting head on the combine, in other applications the sensor can monitor the positions of components other than a harvesting head.

Combine 105 utilizes feeder house 120 to harvest a crop, for example corn, from a field. A harvesting head (not shown) of various types for various crops is attached to feeder house 120 for positioning of the head. Feeder house 120 of combine 105 is rotatable to a lowered or engaged position for crop harvesting. When not engaged in crop harvesting, feeder house 120 is rotatable upward into a raised or non-engaged position. Sensor or head position switch 100 is connected between a portion of combine body 110 and feeder house 120, and is adapted to provide both a visual switch state feedback and an electrical signal indicative of the head position.

Figure 2:
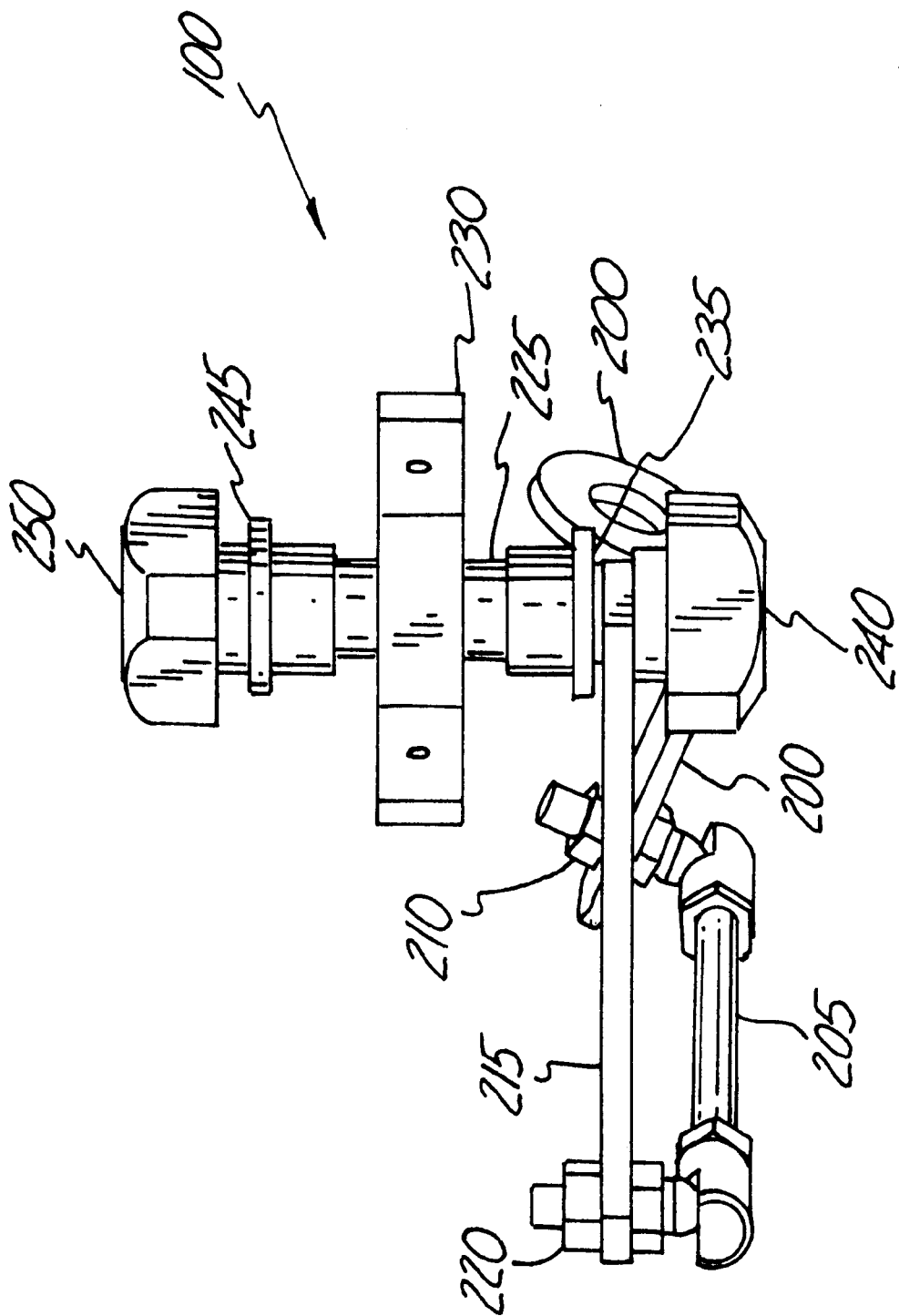
FIG. 2 is a diagrammatic side view illustrating a preferred embodiment of the head switch of the present invention.
Figure 3:
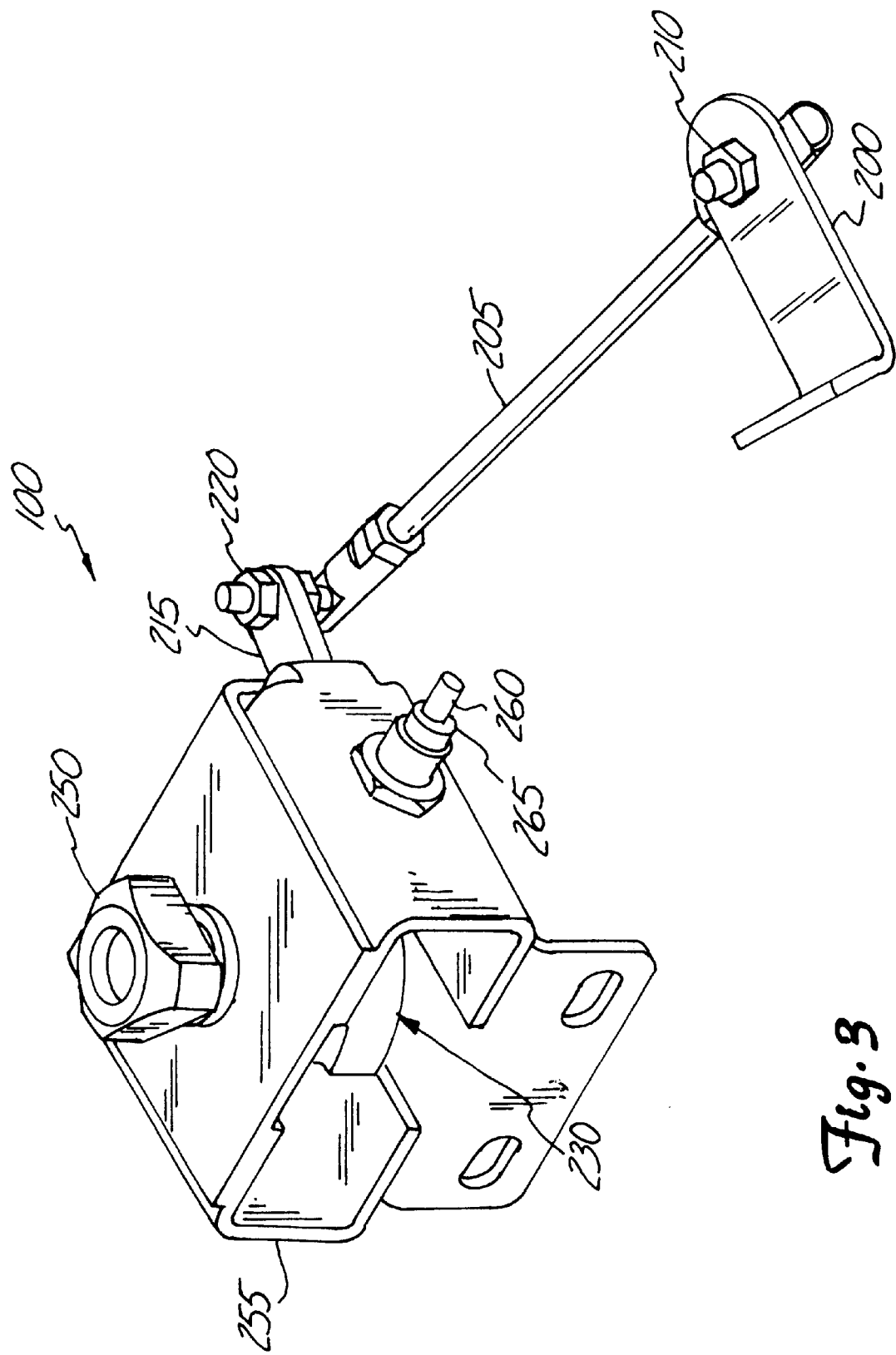
FIG. 3 is a perspective view of the embodiment of the head switch illustrated in FIG. 2.

FIGS. 2, 3 and 4 illustrate a preferred embodiment of head switch 100 in accordance with the present invention. Head switch 100 includes bracket or linkage 200, rod 205, nut/bolt combination 210, lever arm 215, nut/bolt combination 220, shaft 225, cam 230, bushing 235, female knob clamp 240, bushing 245, male knob clamp 250, head switch box 255, shielded cable 260, light emitting diode (LED) 265 and proximity switch 270. Head switch box 255 is omitted from FIG. 2 in order to better illustrate other features of head switch 100. Bracket 200 is adapted for fastening, for example with a nut/bolt combination cooperating with an aperture in bracket 200, for attachment to body 110 of combine 105.

A first end of rod 205 is attached in a rotatable fashion to bracket 200 by nut\bolt combination 210. A second end of rod 205 is attached in a rotatable fashion to a first end of lever arm 215 via nut\bolt combination 220. The second end of lever arm 215 is attached to shaft 225 such that rotation of lever arm 215 causes rotation of shaft 225.

Shaft 225 extends through cam 230 such that rotation of shaft 225 results in simultaneous rotation of cam 230. In preferred embodiments, cam 230 has a half-moon shape which allows head switch 100 to operate in a substantially infinitely adjustable manner such that it can be mounted to an unlimited combination of feeder house\combine body locations without affecting its performance. This infinitely adjustable aspect of head switch 100 allows the user to set-up the head switch for his/her preference of positions. Female knob clamp 240 is coupled via lever arm 215 to shaft 225. Likewise, male knob clamp 250 is attached via bushing 245 to shaft 225. Preferably, bushings 235 and 245 are bronze bushings. With knob clamps 240 and 250 coupled to shaft 225 in this manner, head switch 100 can be easily set-up in a desired position by the operator. As will be discussed in further detail below, during set-up or installation of head switch 100, the operator loosens female knob clamp 240. The operator then rotates male knob clamp 250 until a light provided by LED 265 (discussed below in greater detail) turns on. Then, the operator re-tightens female knob clamp 240 to complete the set-up process.

As illustrated in FIGS. 3 and 4, shielded cable 260 enters head switch box 255 containing cam 230 and shaft 225. Shielded cable 260 is electrically coupled to LED 265 and to proximity switch 270. Shielded cable 260 supplies power, from an external source (shown in FIG. 6), for operation of head switch 100. Shielded cable 260 also carries signals from head switch 100 to external circuitry. Shielded cable 260 is held in position by threaded nuts 262.

Set-up of head switch 100 is typically done with feeder house 120 maintained stationary relative to body 110. At set-up, with bracket 200 mounted to the throat or other portions of combine body 110, and with head switch box 255 mounted to feeder house 120, the operator loosens knob clamp 240. Next, the operator rotates knob clamp 250, which in turn rotates shaft 225 within box 255, until cam 230 comes into close proximity (for example within about 0.030 inches) with proximity switch 270. This causes the switch to toggle and power to be supplied to LED 265, indicating that head switch 100 is properly adjusted. The operator then re-tightens knob clamp 240. The 360° LED ring provides visual feedback to the operator during adjustment, facilitating adjustment in any head switch or operator position. With the LED ring disposed circumferentially about a longitudinal LED axis, the LED ring is adapted to generate the visual signal in all directions in a plane perpendicular to the longitudinal LED axis.

Figure 5A:
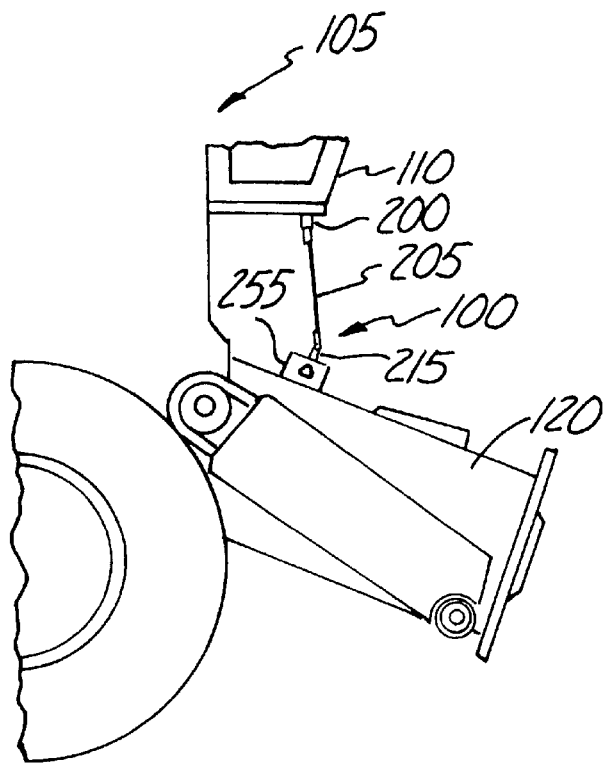
FIGS. 5A and 5B are diagrammatic side views illustrating the head switch of the present invention installed on a combine, with the feeder house of the combine in potential engaged and non-engaged positions, respectively.
Figure 5B:
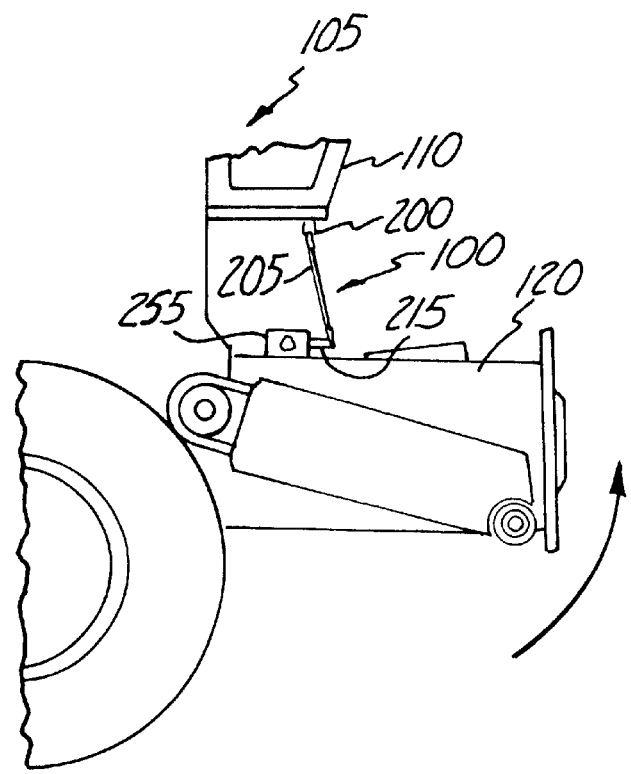

In operation, with bracket 200 mounted to combine body 110, and with head switch box 255 mounted to feeder house 120, movement of feeder house 120 causes a rotation of rod 205 relative to lever arm 215 and bracket 200. This can be seen in FIGS. 5A and 5B. This in turn causes lever arm 215 to rotate relative to head switch box 255. With lever arm 215 coupled to shaft 225, movement of feeder house 120 thus causes rotation of shaft 225 and cam 230 relative to head switch box 255. When cam 230 comes within a short distance from proximity switch 270, the on/off state of switch 100 toggles. In this position, a head switch signal indicative of the state of head switch 100 is provided to external circuitry or devices coupled to cable 260. Simultaneously, 360° visual feedback is provided via LED 265.

Movement of feeder house 120 which causes rotation of shaft 225 to the point that proximity switch 270 loses proximity with cam 230 results in head switch 100 toggling to its off or second state. Consequently, the 360° visual feedback from LED ring 265 and the signal provided on cable 260 reflect this change of state. In preferred embodiments, cam 230 has a half moon shape such that head switch 100 remains in a single state throughout a very wide range of shaft rotation. For example, in one exemplary embodiment of the present invention, the half moon shape of cam 230 allows head switch 100 to remain in the on position or state throughout a rotation of shaft 225 of approximately 200°. In this exemplary embodiment, head switch 100 remains in its off position or state during rotation of shaft 225 of approximately 160°.

Figure 6:
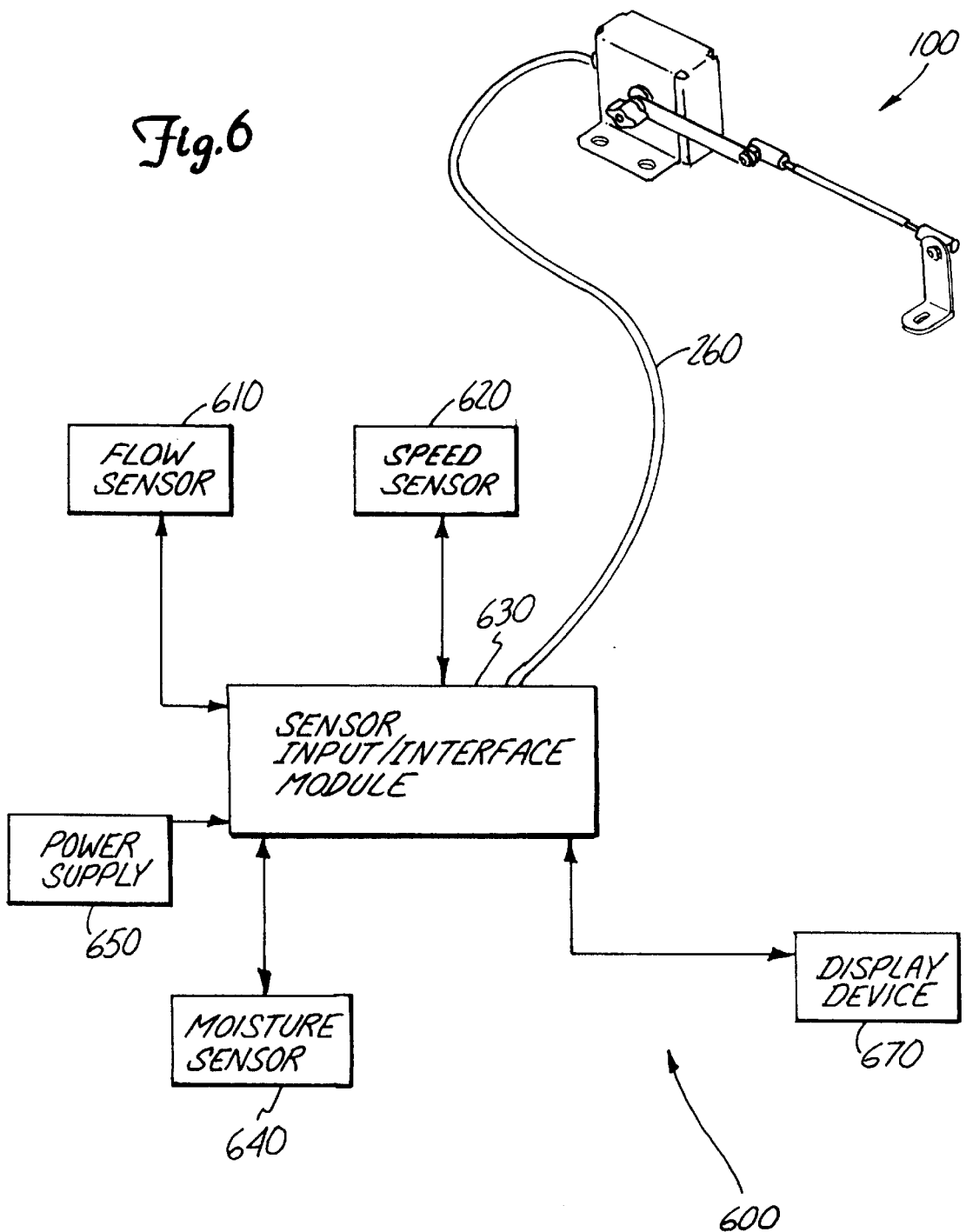
FIG. 6 is a block diagram illustrating a system to which the head switch of the present invention can be coupled in order to calculate and display various combine related functions and information.

FIG. 6 is a block diagram illustrating use of head position switch 100 in a control or monitoring system 600. Monitoring system 600 can be used to record data for purposes of mapping the yield and other characteristics of a field, or simply for providing information to the operator of the combine. In one embodiment, system 100 includes head position switch 100, flow sensor 610, speed sensor 620, sensor input/interface module 630, moisture sensor 640, power supply 650, and display device 670. The particular components of system 600 illustrated in FIG. 6 are included as examples, but are not intended to indicate a limit to the types of devices which can be included in system 600.

Head position switch 100, flow sensor 610, speed sensor 620 and moisture sensor 640 are all coupled to sensor input/interface module 630 and provide sensor information to module 630 for recording and/or controlling characteristics associated with the operation of combine 105 or the characteristics of the field or crop. For example, flow sensor 610 can be of the type which monitors a pressure of a flow of clean crop yield product harvested by the combine and provides signals to sensor module 630 which can be used to map the yield at different positions within the field. Speed sensor 620 provides an output indicative of the speed of combine 105. The speed indicative signal can be used to aid in generating yield maps. Moisture sensor 640 senses moisture content of the clean crop yield, which can likewise be utilized when field mapping. Power supply 650 provides power to module 630, which in turn provides power to each of flow sensor 610, speed sensor 620, moisture sensor 640, head position switch 100, and any other devices desired.

Display device 670 is coupled to module 630 and can be used to provide a visual display of sensor or other information to the operator of combine 105. Additionally, display device 670 can include a controller, such as a microprocessor, for recording or processing data.

Although the present invention has been described with reference to preferred embodiments, workers skilled in the art will recognize that changes may be made in form and detail without departing from the spirit and scope of the invention.

What is claimed is:

1. A position sensor for providing an output signal indicative of a position of a first portion of a piece of equipment relative to a second portion of the piece of equipment, the position sensor comprising:

a cam;

a shaft rotatably coupled to the first portion of the piece of equipment and extending along a longitudinal shaft axis through the cam such that rotation of the shaft about the longitudinal shaft axis causes rotation of the cam about the longitudinal shaft axis;

a proximity switch positioned adjacent the cam, wherein rotation of the shaft through a first rotational range causes the cam to remain in a close proximity position with the proximity switch throughout at least about a 100° rotation of the shaft, and such that rotation of the shaft through a second rotational range causes the cam to remain out of the close proximity position with the proximity switch throughout at least about a 100° rotation of the shaft, the proximity switch providing the output signal as a function of whether the cam is in the close proximity position with the proximity switch;

a bracket rigidly attached to the second portion of the piece of equipment;

a first longitudinally extending member pivotally coupled at a first end to the bracket and pivoting about the first end relative to the bracket and the second portion of the piece of equipment;

a second longitudinally extending member pivotally coupled at a first end to a second end of the first member such that the second member pivots about its first end relative to the first member, the second member also being coupled at a second end to the shaft such that rotation of the second member caused by movement of the first portion of the piece of equipment relative to the second portion of the piece of equipment causes rotation of the shaft and of the cam;

a cable coupled to the proximity switch and electrically coupling the proximity switch to remote circuitry in order to provide the output signal to the remote circuitry;

a light emitting diode (LED) ring coupled to the proximity switch and disposed circumferentially about a longitudinal LED axis, wherein in response to the output signal provided by the proximity switch the LED ring generates a visual signal in all directions in a plane perpendicular to the longitudinal LED axis, the visual signal being indicative of a state of the position sensor during adjustment of the position sensor by an operator.

2. The position sensor of claim 1, wherein the cam has a half-moon shape.

3. The position sensor of claim 1, and further comprising a shaft adjustment mechanism adapted for use by the operator of the piece of equipment to rotate the shaft while the first portion of the piece of equipment remains substantially stationary relative to the second portion of the piece of equipment in order to adjust the position sensor, wherein the LED ring provides the visual signal upon rotation of the shaft by the shaft adjustment mechanism to a position in which the cam is in close proximity with the proximity switch.

4. A head position switch for providing an output indicative of a position of a harvesting head of a harvesting vehicle, the head position switch comprising:

body attachment means for coupling the head position switch to a body of the vehicle;

head attachment means for coupling the head position switch to a feeder house which supports the harvesting head of the vehicle; and adjustment visual feedback means for generating a visual signal indicative of a state of the head position switch during adjustment of the head position switch by an operator.

5. The head position switch of claim 4, wherein the adjustment visual feedback means includes a light emitting diode (LED) ring disposed circumferentially about a longitudinal LED axis and adapted to generate the visual signal in all directions in a plane perpendicular to the longitudinal LED axis.

6. The head position switch of claim 5, and further comprising:

a cam;

a shaft extending along a longitudinal shaft axis through the cam such that rotation of the shaft about the longitudinal shaft axis causes rotation of the cam about the longitudinal shaft axis;

a proximity switch electrically coupled to the LED ring and positioned adjacent the cam such that rotation of the shaft causes the cam to move into and out of close proximity with the proximity switch, the proximity switch providing a signal indicative of whether the cam is in proximity with the proximity switch and thereby providing the output indicative of the position of the harvesting head, wherein the LED ring provides the visual signal as a function of the signal provided by the proximity switch; and shaft rotation means coupled to the shaft for rotating the shaft as the harvesting head moves relative to the body of the vehicle.

7. The head position switch of claim 6, wherein the shaft is coupled to the head attachment means and wherein the shaft rotation means is coupled to body attachment means.

8. The head position switch of claim 7, wherein the cam has a shape which causes the proximity switch to remain in either of two proximity switch states without toggling to the other of the two proximity switch states during a rotation of the shaft and the cam of at least about 160°.

9. The head position switch of claim 8, wherein the shape of the cam is a half-moon shape.

10. The head position switch of claim 9, wherein the shaft rotation means comprises:

a rod coupled at a first end to the body attachment means and pivoting about the first end relative to the body attachment means; and a lever coupled at a first end to a second end of the rod such that the lever pivots about the first end relative to the second end of the rod, the lever also being coupled at a second end to the shaft such that rotation of the lever caused by raising or lowering the harvesting head causes rotation of the shaft and of the cam.

11. The head position switch of claim 10, wherein the body attachment means includes a bracket rigidly attached to the body of the vehicle, and wherein the head attachment mechanism includes a box rigidly attached to the feeder house, wherein the shaft is rotatably coupled to the box, and wherein the proximity switch is rigidly coupled to the box in a position adjacent the cam.

12. The head position switch of claim 11, and further comprising shaft adjustment means for rotating the shaft relative to the box while the harvesting head remains substantially stationary relative to the body of the vehicle in order to adjust the head position switch, wherein the LED ring provides the visual signal upon rotation of the shaft by the shaft adjustment means to a position in which the cam is in close proximity with the proximity switch.

13. A head position switch for providing an output signal indicative of a position of a harvesting head of a harvesting vehicle relative to a body of the harvesting vehicle, the head position switch comprising:

a cam;

a shaft rotatably coupled to a feeder house of the harvesting vehicle and extending along a longitudinal shaft axis through the cam such that rotation of the shaft about the longitudinal shaft axis causes rotation of the cam about the longitudinal shaft axis;

a proximity switch positioned adjacent the cam, wherein rotation of the shaft through a first rotational range causes the cam to remain in a close proximity position with the proximity switch throughout at least about a 200° rotation of the shaft, and such that rotation of the shaft through a second rotational range causes the cam to remain out of the close proximity position with the proximity switch throughout at least about a 160° rotation of the shaft, the proximity switch providing the output signal as a function of whether the cam is in the close proximity position with the proximity switch;

a bracket rigidly attached to the body of the vehicle;

a first longitudinally extending member pivotally coupled at a first end to the bracket and pivoting about the first end relative to the bracket and the body of the vehicle;

a second longitudinally extending member pivotally coupled at a first end to a second end of the first member such that the second member pivots about its first end relative to the first member, the second member also being coupled at a second end to the shaft such that rotation of the second member caused by movement of the feeder house relative to the body of the vehicle causes rotation of the shaft and of the cam;

a cable coupled to the proximity switch and electrically coupling the proximity switch to remote circuitry in order to provide the output signal to the remote circuitry;

a light emitting diode (LED) ring coupled to the proximity switch and disposed circumferentially about a longitudinal LED axis, wherein in response to the output signal provided by the proximity switch the LED ring generates a visual signal in all directions in a plane perpendicular to the longitudinal LED axis, the visual signal being indicative of a state of the head position switch during adjustment of the head position switch by an operator.

14. The head position switch of claim 13, wherein the shaft is rotatably coupled to the feeder house through a housing, wherein the housing is rigidly coupled to the feeder house and wherein the shaft is rotatably mounted within the housing.

15. The head position switch claim 14, wherein the proximity switch is rigidly mounted in the housing adjacent the cam.

16. The head position switch of claim 15, and further comprising a shaft adjustment mechanism adapted for use by the operator of the vehicle to rotate the shaft while the feeder house remains substantially stationary relative to the body of the vehicle in order to adjust the head position switch, wherein the LED ring provides the visual signal upon rotation of the shaft by the shaft adjustment mechanism to a position in which the cam is in close proximity with the proximity switch.

* * * * *